(12) United States Patent
Liu et al.

(10) Patent No.: US 10,079,666 B2
(45) Date of Patent: Sep. 18, 2018

(54) APPARATUS AND METHOD FOR SELF-INTERFERENCE CANCELLATION

(71) Applicant: Huawei Technologies Co., Ltd., Shenzhen, Guangdong (CN)

(72) Inventors: Sheng Liu, Shenzhen (CN); Teyan Chen, Shenzhen (CN); Hong Cheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 40 days.

(21) Appl. No.: 15/269,313

(22) Filed: Sep. 19, 2016

(65) Prior Publication Data

US 2017/0005773 A1 Jan. 5, 2017

Related U.S. Application Data

(63) Continuation of application No. PCT/CN2014/073775, filed on Mar. 20, 2014.

(51) Int. Cl.
H04J 1/12 (2006.01)
H04L 5/00 (2006.01)
H04B 1/525 (2015.01)

(52) U.S. Cl.
CPC ........... *H04L 5/0073* (2013.01); *H04B 1/525* (2013.01); *H04L 5/005* (2013.01)

(58) Field of Classification Search
CPC .................................................... H04L 5/0073
USPC ........................................................ 370/201
See application file for complete search history.

(56) References Cited

U.S. PATENT DOCUMENTS

| 6,614,766 | B1 | 9/2003 | Seki et al. |
| 2008/0024785 | A1* | 1/2008 | Froggatt ............ G01M 11/3172 356/450 |
| 2008/0088507 | A1* | 4/2008 | Smith .................. G01C 21/165 342/386 |
| 2009/0103100 | A1* | 4/2009 | Froggatt .............. G01M 11/083 356/477 |
| 2009/0185810 | A1* | 7/2009 | Kaplan ................... G02F 1/225 398/184 |
| 2010/0272005 | A1 | 10/2010 | Larsson et al. |

(Continued)

FOREIGN PATENT DOCUMENTS

| CN | 1783733 A | 6/2006 |
| CN | 103095351 A | 5/2013 |

Primary Examiner — Shripal Khajuria

(57) ABSTRACT

Embodiments of the present invention provide an apparatus for self-interference cancellation. The apparatus includes: a first splitter, configured to perform splitting processing on a local oscillator signal generated by a local oscillator to separately transmit the local oscillator signal to an up-converter and a delayer; the up-converter, configured to perform up-conversion processing on a baseband transmit signal according to the local oscillator signal to generate a transmit signal; the delayer, configured to perform delaying processing on the local oscillator signal according to a preset target delay; a first down-converter, configured to perform, based on the local oscillator signal obtained after the delaying processing, down-conversion processing on a receive signal to acquire a baseband receive signal, and transmit the baseband receive signal to a self-interference canceller; and the self-interference canceller, configured to perform self-interference cancellation processing on the baseband receive signal.

18 Claims, 7 Drawing Sheets

(56) References Cited

U.S. PATENT DOCUMENTS

2012/0170680 A1* 7/2012 Stern .................. H04L 5/0039
375/299
2012/0213531 A1* 8/2012 Nazarathy ............ H03M 1/145
398/202

* cited by examiner

APPARATUS AND METHOD FOR SELF-INTERFERENCE CANCELLATION

CROSS-REFERENCE TO RELATED APPLICATIONS

This application is a continuation of International Application No. PCT/CN2014/073775, filed on Mar. 20, 2014, the disclosure of which is hereby incorporated by reference in its entirety.

TECHNICAL FIELD

Embodiments of the present invention relate to the field of communications technologies, and more specifically, to an apparatus and a method for self-interference cancellation.

BACKGROUND

In a wireless communications system such as a mobile cellular communications system, a wireless local area network (WLAN), or a fixed wireless access (FWA) system, a communications node such as a base station (BS), an access point (AP), a relay station (RS), or user equipment (UE) has a capability of transmitting a signal of the communications node and receiving a signal from another communications node. Because a radio signal on a radio channel is greatly attenuated, compared with a transmit signal of the communications node, a signal from a communications peer end becomes very weak when the signal reaches a receive end. For example, in the mobile cellular communications system, a power difference between a receive signal and a transmit signal of a communications node reaches 80 dB to 140 dB or even more. Therefore, to avoid self-interference of a transmit signal to a receive signal of a same transceiver, generally, receiving and transmitting of radio signals are performed at different frequency bands or in different time periods. For example, in a frequency division duplex (FDD) system, different bands separated by a specific guard band are used for sending and receiving. In a time division duplex (TDD) system, different time periods at a specific guard interval are used for sending and receiving. Both the guard band in the FDD system and the guard interval in the FDD system are used to ensure full isolation between the receiving and the sending, and avoid interference caused by the sending to the receiving.

Different from an existing FDD or TDD technology, a wireless full-duplex technology supports simultaneous receiving and sending operations on a same radio channel. In this case, spectral efficiency of the wireless full-duplex technology is theoretically twice as much as that of the FDD or TDD technology. Obviously, the premise of implementing wireless full-duplex is to avoid, reduce, and cancel as much as possible strong interference (referred to as self-interference) caused by a transmit signal to a receive signal of a same transceiver, so that the strong interference causes no impact on correct receiving of a wanted signal.

FIG. 1 is a schematic block diagram of an interference suppression principle in an existing wireless full-duplex system. A DAC (digital-to-analog converter), an up-converter and a power amplifier that are on a transmit channel, a low noise amplifier (LNA), a down-converter and an ADC (analog-to-digital converter) that are on a receive channel, and the like are functional modules of an intermediate frequency unit in an existing transceiver. Self-interference cancellation on a transmit signal is completed by using units shown in the figure, such as a spatial interference suppression unit, a radio frequency front-end analog interference cancellation unit, and a digital interference cancellation unit.

As shown in FIG. 1, the digital interference cancellation unit uses a digital baseband signal of a transmitter as a reference signal, and adjusts the reference signal by using estimated parameters of a channel from a local transmit antenna to a local receive antenna, such as an amplitude and a phase, so that the reference signal is as close as possible to a self-interference signal element in a receive signal (specifically, a digital-domain receive signal obtained after down-conversion processing), and a local self-interference signal received by the receive antenna is cancelled in the digital domain.

As mentioned above, the self-interference signal cancellation in a digital baseband part is generally performed after down-conversion processing in the receiver. Therefore, performance of the self-interference cancellation is greatly affected by factors, such as a phase noise, on a radio frequency channel in the system. If the impact is not eliminated, the performance of the self-interference cancellation is greatly affected.

Therefore, it is expected to provide a technology that can improve performance of self-interference cancellation.

SUMMARY

Embodiments of the present invention provide an apparatus and a method for self-interference cancellation, which can improve performance of self-interference cancellation.

According to a first aspect, an apparatus for self-interference cancellation is provided, where the apparatus includes: a local oscillator 110, a first splitter 120, an up-converter 130, a delayer 140, a first down-converter 150, and a self-interference canceller 190, where an output port of the first local oscillator 110 is connected to an input port of the first splitter 120, a first output port 122 of the first splitter 120 is connected to a first input port 132 of the up-converter 130, an output port of the up-converter 130 is connected to a transmit antenna, a second output port 124 of the first splitter 120 is connected to an input port of the delayer 140, an output port of the delayer 140 is connected to a first input port 152 of the first down-converter 150, a second input port 154 of the first down-converter 150 is connected to a receive antenna, and an output port 154 of the first down-converter 150 is connected to a first input port 192 of the self-interference canceller 190, where the local oscillator 110 is configured to generate a local oscillator signal and transmit the local oscillator signal to the first splitter 120; the first splitter 120 is configured to perform splitting processing on the local oscillator signal to separately transmit the local oscillator signal to the up-converter 130 and the delayer 140; the up-converter 130 is configured to acquire a baseband transmit signal, and perform up-conversion processing on the baseband transmit signal according to the local oscillator signal, to generate a radio frequency transmit signal; the delayer 140 is configured to determine a target delay, and perform delaying processing on the local oscillator signal according to the target delay; the first down-converter 150 is configured to acquire the radio frequency receive signal and the local oscillator signal obtained after the delaying processing, perform, based on the local oscillator signal obtained after the delaying processing, down-conversion processing on the radio frequency receive signal to acquire a baseband receive signal, and transmit the baseband receive signal to the self-interference canceller 190, where a delay value of the delaying processing is a delay between the baseband transmit signal and the baseband receive signal;

and the self-interference canceller 190 is configured to perform self-interference cancellation processing on the baseband receive signal.

In an implementation manner of the first aspect, the self-interference canceller 190 is specifically configured to acquire the baseband transmit signal, perform, based on the baseband receive signal, an amplitude adjustment and a phase adjustment on the baseband transmit signal, and combine the baseband receive signal with a baseband transmit signal obtained after the amplitude adjustment and the phase adjustment to generate a target signal, where energy of the target signal is less than energy of the baseband receive signal.

With reference to the first aspect and any implementation manner of the foregoing implementation manner, in another implementation manner of the first aspect, the apparatus further includes: a second splitter 160, a third splitter 170, and a second down-converter 180, where the output port of the delayer 140 is indirectly connected to the first input port 152 of the first down-converter 150 by using the second splitter 160, the output port of the delayer 140 is connected to an input port of the second splitter 160, a first output port 162 of the second splitter 160 is connected to the first input port 152 of the first down-converter 150, a second output port 164 of the second splitter 160 is connected to a first input port 182 of the second down-converter 180, the output port of the up-converter 130 is indirectly connected to the transmit antenna by using the third splitter 170, the output port of the up-converter 130 is connected to an input port of the third splitter 170, a first output port 172 of the third splitter 170 is connected to the transmit antenna, a second output port 174 of the third splitter 170 is connected to a second input port 184 of the second down-converter 180, and a second input port 194 of the self-interference canceller 190 is connected to an output port of the second down-converter 180, where the second splitter 160 is configured to acquire, from the delayer 140, the local oscillator signal obtained after the delaying processing, and perform splitting processing on the local oscillator signal obtained after the delaying processing to separately transmit the local oscillator signal obtained after the delaying processing to the first down-converter 150 and the second down-converter 180; the third splitter 170 is configured to acquire the radio frequency transmit signal from the up-converter 130, acquire a radio frequency reference signal according to the radio frequency transmit signal, send the radio frequency transmit signal to the transmit antenna, and send the radio frequency reference signal to the second down-converter 180; and the second down-converter 180 is configured to perform, based on the local oscillator signal obtained after the delaying processing, down-conversion processing on the radio frequency reference signal to acquire a baseband reference signal, and send the baseband reference signal to the self-interference canceller 190; where the self-interference canceller 190 is specifically configured to perform, based on the baseband reference signal, self-interference cancellation processing on the baseband receive signal.

With reference to the first aspect and any implementation manner of the foregoing implementation manners, in another implementation manner of the first aspect, the self-interference canceller 190 is specifically configured to acquire, based on the baseband reference signal, an estimation of a baseband self-interference signal in the baseband receive signal, and cancel the baseband self-interference signal in the baseband receive signal by using the estimation of the baseband self-interference signal.

With reference to the first aspect and any implementation manner of the foregoing implementation manners, in another implementation manner of the first aspect, the target delay is determined according to a first delay, a second delay, and a third delay, where the first delay is a processing delay after the up-conversion processing in a transmit branch, the second delay is a processing delay before the down-conversion processing in a receive branch, and the third delay is an average delay of a multipath signal from the transmit antenna to the receive antenna.

According to a second aspect, an apparatus for self-interference cancellation is provided, where the apparatus includes: a local oscillator 210, a first splitter 220, a second splitter 230, a first down-converter 240, a second down-converter 250, and a self-interference canceller 260, where an output port of the local oscillator 210 is connected to an input port of the first splitter 220, a first output port 222 of the first splitter 220 is connected to a first input port 242 of the first down-converter 240, a second output port 224 of the first splitter 220 is connected to a first input port 252 of the second down-converter 250, a second input port 244 of the first down-converter 240 is connected to a receive antenna, an output port of the first down-converter 240 is connected to a first input port 262 of the self-interference canceller 260, a first output port 232 of the second splitter 230 is connected to a transmit antenna, a second output port 234 of the second splitter 230 is connected to a second input port 254 of the second down-converter 250, and an output port of the second down-converter 250 is connected to a second input port 264 of the self-interference canceller 260, where the local oscillator 210 is configured to generate a local oscillator signal and transmit the local oscillator signal to the first splitter 220; the first splitter 220 is configured to perform splitting processing on the local oscillator signal to separately transmit the local oscillator signal to the first down-converter 240 and the second down-converter 250; the first down-converter 240 is configured to acquire a radio frequency receive signal from the receive antenna, perform, based on the local oscillator signal, down-conversion processing on the radio frequency receive signal to acquire a baseband receive signal, and send the baseband receive signal to the self-interference canceller 260; the second splitter 230 is configured to acquire a radio frequency reference signal according to a radio frequency transmit signal, send the radio frequency transmit signal to the transmit antenna, and send the radio frequency reference signal to the second down-converter 250; the second down-converter 250 is configured to perform, based on the local oscillator signal, down-conversion processing on the radio frequency reference signal to acquire a baseband reference signal, and send the baseband reference signal to the self-interference canceller 260; and the self-interference canceller 260 is configured to perform self-interference cancellation processing on the baseband receive signal according to the baseband reference signal.

In an implementation manner of the second aspect, the self-interference canceller 260 is specifically configured to acquire, based on the baseband reference signal, an estimation of a baseband self-interference signal in the baseband receive signal, and cancel the baseband self-interference signal in the baseband receive signal by using the estimation of the baseband self-interference signal.

According to a third aspect, a method for self-interference cancellation is provided, where the method includes: generating a local oscillator signal; acquiring a baseband transmit signal, and performing up-conversion processing on the baseband transmit signal according to the local oscillator signal to generate a radio frequency transmit signal; determining a target delay, and performing delaying processing on the local oscillator signal according to the target delay; acquiring a radio frequency receive signal, and performing, based on the local oscillator signal obtained after the delaying processing, down-conversion processing on the radio frequency receive signal to acquire a baseband receive signal, where the target delay is a delay between the baseband transmit signal and the baseband receive signal; and performing self-interference cancellation processing on the baseband receive signal.

In an implementation manner of the third aspect, the performing self-interference cancellation processing on the baseband receive signal includes: acquiring, based on the baseband transmit signal, an estimation of a baseband self-interference signal in the baseband receive signal, and canceling the baseband self-interference signal in the baseband receive signal by using the estimation of the baseband self-interference signal.

With reference to the third aspect and any implementation manner of the foregoing implementation manner, in another implementation manner of the first aspect, the method further includes: acquiring a radio frequency reference signal according to the radio frequency transmit signal; and performing, based on the local oscillator signal obtained after the delaying processing, down-conversion processing on the radio frequency reference signal to acquire a baseband reference signal; and the performing self-interference cancellation processing on the baseband receive signal includes: performing, based on the baseband reference signal, self-interference cancellation processing on the baseband receive signal.

With reference to the third aspect and any implementation manner of the foregoing implementation manners, in another implementation manner of the first aspect, the performing, based on the baseband reference signal, self-interference cancellation processing on the baseband receive signal includes: acquiring, based on the baseband reference signal, an estimation of a baseband self-interference signal in the baseband receive signal and canceling the baseband self-interference signal in the baseband receive signal by using the estimation of the baseband self-interference signal.

With reference to the third aspect and any implementation manner of the foregoing implementation manners, in another implementation manner of the first aspect, the determining a target delay includes: determining the target delay according to a first delay, a second delay, and a third delay, where the first delay is a processing delay after the up-conversion processing in a transmit branch, the second delay is a processing delay before the down-conversion processing in a receive branch, and the third delay is an average delay of a multipath signal from a transmit antenna to a receive antenna.

According to a fourth aspect, a method for self-interference cancellation is provided, where the method includes: generating a local oscillator signal; acquiring a radio frequency receive signal, and performing, based on the local oscillator signal, down-conversion processing on the radio frequency receive signal to acquire a baseband receive signal; acquiring a radio frequency reference signal according to a radio frequency transmit signal, and performing down-conversion processing, based on the local oscillator signal, on the radio frequency reference signal to acquire a baseband reference signal; and performing self-interference cancellation processing on the baseband receive signal according to the baseband reference signal.

In an implementation manner of the fourth aspect, the performing self-interference cancellation processing on the baseband receive signal according to the baseband reference signal includes: acquiring, based on the baseband reference signal, an estimation of a baseband self-interference signal in the baseband receive signal, and canceling the baseband self-interference signal in the baseband receive signal by using the estimation of the baseband self-interference signal.

According to the apparatus and the method for self-interference cancellation in the embodiments of the present invention, up-conversion processing on a baseband transmit signal and down-conversion processing on a radio frequency receive signal are performed based on local oscillator signals generated by a same oscillator source, and self-interference signal cancellation is performed, according to the baseband transmit signal or a baseband reference signal, on a baseband receive signal generated after the down-conversion processing; or, down-conversion processing is performed, based on local oscillator signals generated by a same oscillator source, on a radio frequency receive signal and a radio frequency reference signal, and self-interference signal cancellation is performed, according to a baseband reference signal generated after the down-conversion processing, on a baseband receive signal generated after the down-conversion processing, which can effectively eliminate impact of a phase noise of a radio frequency channel in a system on performance of self-interference cancellation, thereby improving the performance of the self-interference cancellation.

BRIEF DESCRIPTION OF THE DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

REFERENCE NUMERALS

Figure 1:
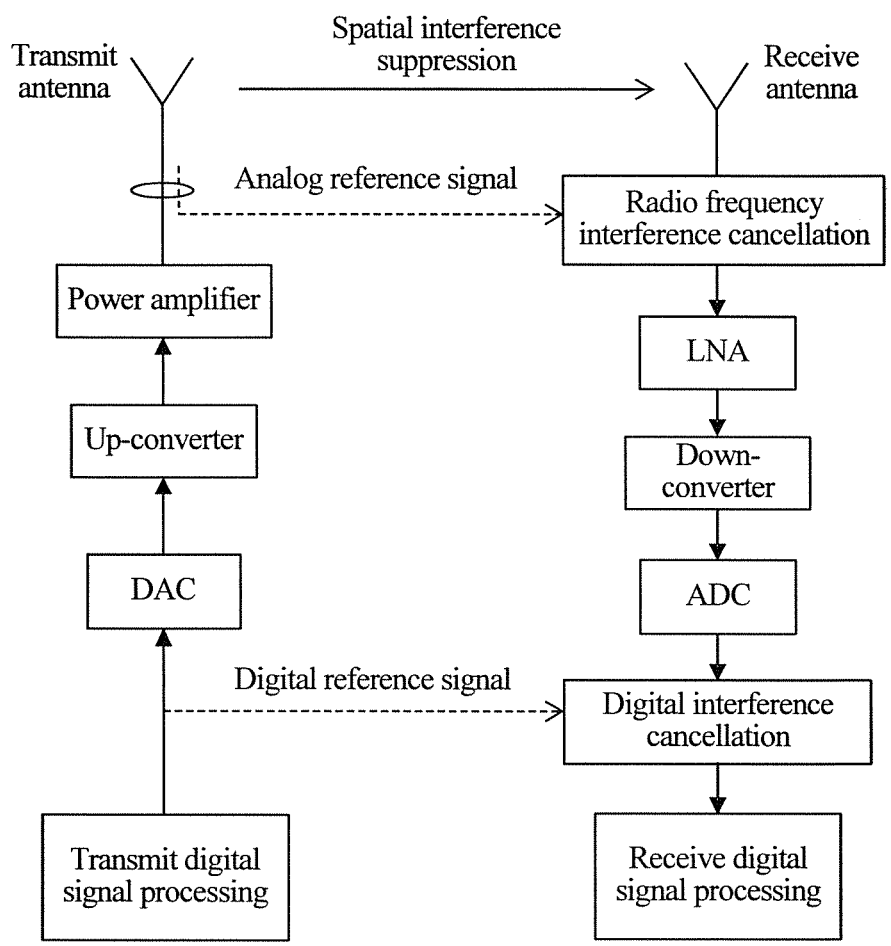
FIG. 1 is a schematic block diagram of an interference suppression principle in an existing wireless full-duplex system.

110 local oscillator
120 first splitter
122 first output port of the first splitter
124 second output port of the first splitter 130 up-converter
132 first input port of the up-converter
134 second input port of the up-converter
140 delayer
150 first down-converter
152 first input port of the first down-converter
154 second input port of the first down-converter
160 second splitter
162 first output port of the second splitter
164 second output port of the second splitter
170 third splitter
172 first output port of the third splitter
174 second output port of the third splitter
180 second down-converter
182 first input port of the second down-converter
184 second input port of the second down-converter
190 self-interference canceller
192 first input port of the self-interference canceller
194 second input port of the self-interference canceller
210 local oscillator
220 first splitter
222 first output port of the first splitter
224 second output port of the first splitter
230 second splitter
232 first output port of the second splitter
234 second output port of the second splitter
230 up-converter
232 first input port of the up-converter
234 second input port of the up-converter
240 first down-converter
242 first input port of the first down-converter
244 second input port of the first down-converter
250 second down-converter
252 first input port of the second down-converter
254 second input port of the second down-converter
260 self-interference canceller
262 first input port of the self-interference canceller
264 second input port of the self-interference canceller

DETAILED DESCRIPTION

Currently, multiple embodiments are described with reference to accompanying drawings, where a same reference numeral is used to indicate a same element in this specification. In the following description, for ease of explanation, a large quantity of specific details is given to provide a full understanding of one or more embodiments. However, obviously, these specific details may also not be used to implement the embodiments. In another example, a common structure and device are shown in a form of a block diagram, so as to describe the one or more embodiments.

The terms "component", "module", "system", and the like used in this specification are used to indicate a computer-related entity, hardware, firmware, a combination of hardware and software, software, or software in execution. For example, a component may be but is not limited to a process running on a processor, a processor, an object, an executable file, an execution thread, a program, and/or a computer. As shown in a diagram, both an application running on a computing device and a computing device may be components. One or more components may camp in a process and/or an execution thread, and the components may be located on a computer and/or distributed between two or more computers. In addition, these components may be executed on computer readable media on which data structures are stored. The components may communicate, for example, according to a signal that has one or more data packets (for example, data from two components that interact with another component in a local system, a distributed system, and/or a network, and for example, the Internet that interacts with another system by using a signal), with each other by using a local process and/or a remote process.

In the embodiments of the present invention, an apparatus for self-interference cancellation may be set on or may be an access terminal that uses a wireless full-duplex technology. The access terminal may also be referred to as a system, a subscriber unit, a subscriber station, a mobile station, a mobile station, a remote station, a remote terminal, a mobile device, a user terminal, a terminal, a wireless communications device, a user agent, a user apparatus, or user equipment (UE). The access terminal may be a cellular phone, a cordless phone, a SIP (Session Initiation Protocol) phone, a WLL (Wireless Local Loop) station, a PDA (Personal Digital Assistant), a handheld device with a wireless communications function, a computing device, or another processing device connected to a wireless modem.

In addition, in the embodiments of the present invention, the apparatus for self-interference cancellation may also be set on or may be a base station that uses a wireless full-duplex technology. The base station can be used to communicate with a mobile device. The base station may be a WiFi AP (Access Point), or a BTS (Base Transceiver Station) in GSM (Global System for Mobile Communications) or CDMA (Code Division Multiple Access), or an NB (NodeB) in WCDMA (Wideband Code Division Multiple Access), or an eNB or an eNodeB (evolved NodeB) in LTE (Long Term Evolution), or a relay station or an access point, or a base station device in a future 5G network, or the like.

In addition, aspects or features of the present invention may be implemented as an apparatus or a product that uses standard programming and/or an engineering technology. The term "product" used in this application covers a computer program that can be accessed from any computer readable component, carrier, or medium. For example, the computer readable medium may include but is not limited to: a magnetic storage component (for example, a hard disk, a floppy disk, or a magnetic tape), an optical disc (for example, a CD (Compact Disk), a DVD (Digital Versatile Disk), and the like), a smartcard, a flash memory component (for example, an EPROM (Erasable Programmable Read-Only Memory), a card, a stick, a key driver, or the like). In addition, storage media described in this specification may represent one or more devices and/or another machine readable medium that are/is used to store information. The term "machine readable medium" may include but is not limited to a radio channel, and another medium that can store, contain, and/or carry an instruction and/or data.

Figure 2:
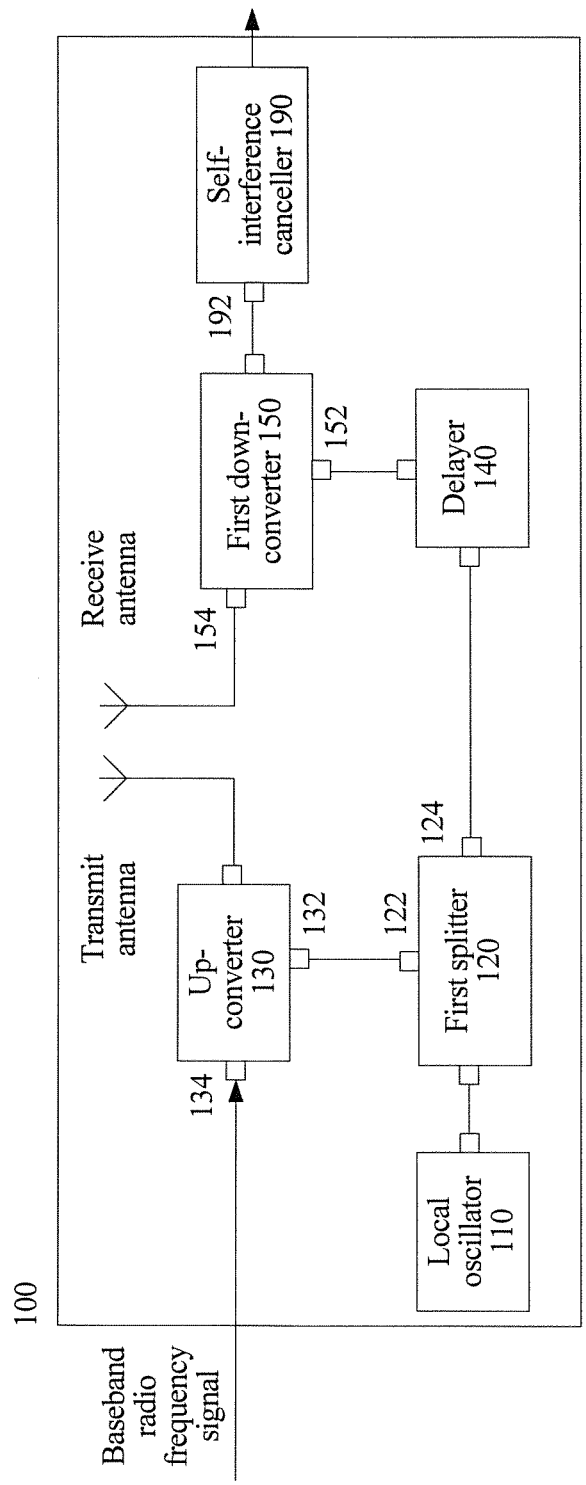
FIG. 2 is a schematic structural diagram of an apparatus for self-interference cancellation according to an embodiment of the present invention.

FIG. 2 is a schematic structural diagram of an apparatus 100 for self-interference cancellation according to an embodiment of the present invention. As shown in FIG. 2, the apparatus 100 includes:

a local oscillator 110, a first splitter 120, an up-converter 130, a delayer 140, a first down-converter 150, and a self-interference canceller 190. An output port of the first local oscillator 110 is connected to an input port of the first splitter 120; a first output port 122 of the first splitter 120 is connected to a first input port 132 of the up-converter 130; an output port of the up-converter 130 is connected to a transmit antenna; a second output port 124 of the first splitter 120 is connected to an input port of the delayer 140; an output port of the delayer 140 is connected to a first input port 152 of the first down-converter 150; a second input port 154 of the first down-converter 150 is connected to a receive antenna; and an output port 154 of the first down-converter 150 is connected to a first input port 192 of the self-interference canceller 190.

The local oscillator 110 is configured to generate a local oscillator signal and transmit the local oscillator signal to the first splitter 120.

The first splitter 120 is configured to perform splitting processing on the local oscillator signal to separately transmit the local oscillator signal to the up-converter 130 and the delayer 140.

The up-converter 130 is configured to acquire a baseband transmit signal, and perform up-conversion processing on the baseband transmit signal according to the local oscillator signal to generate a radio frequency transmit signal.

The delayer 140 is configured to perform delaying processing on the local oscillator signal according to a preset target delay.

The first down-converter 150 is configured to acquire a radio frequency receive signal and the local oscillator signal obtained after the delaying processing, perform, based on the local oscillator signal obtained after the delaying processing, down-conversion processing on the radio frequency receive signal to acquire a baseband receive signal, and transmit the baseband receive signal to the self-interference canceller 190, where a delay value of the delaying processing is a delay between the baseband transmit signal and the baseband receive signal.

The self-interference canceller 190 is configured to perform self-interference cancellation processing on the baseband receive signal.

The following separately describes in detail a connection relationship, structures, and functions of the components.

A. Local Oscillator 110

As a local oscillator source used for the up-conversion processing and down-conversion processing in the embodiment of the present invention, the local oscillator 110 is configured to generate a local oscillator signal (also referred to as a carrier signal). In addition, in the embodiment of the present invention, as an example instead of a limitation, for example, a voltage-controlled oscillator (VCO) may be used as the local oscillator 110.

After generating a local oscillator signal, the local oscillator 110 sends the local oscillator signal to the input port of the first splitter 120 by using the output port (not shown in the figure) of the local oscillator 110.

In the embodiment of the present invention, a method and a process in which the local oscillator 110 generates the local oscillator signal may be similar to those in the prior art. To avoid a repeated description, a description about the method and the process is herein omitted.

B. First Splitter 120

The first splitter 120 receives the local oscillator signal from the local oscillator 110 by using the input port (not shown in the figure) of the first splitter 120, and performs splitting processing on the local oscillator signal to split the local oscillator signal into two signals, where one signal is used as a local oscillator signal (for ease of understanding, denoted as a local oscillator signal 1 in the following) for the up-conversion processing, and is transmitted to the up-converter 130 (specifically, the first input port 132 of the up-converter 130) by using the first output port 122 of the first splitter 120; and the other signal is used as a local oscillator signal (for ease of understanding, denoted as a local oscillator signal 2 in the following) for the down-conversion processing, and is transmitted to the delayer 140 by using the second output port 124 of the first splitter 120, and then transmitted to the down-converter 150 (specifically, the first input port 152 of the down-converter 150) after the delaying processing (that is described in detail in the following) by the delayer 140.

In the embodiment of the present invention, as an example instead of a limitation, for example, a coupler or a power divider may be used as the first splitter 120.

It should be noted that in the embodiment of the present invention, power of the local oscillator signal 1 for the up-conversion processing may be the same as or different from that of the local oscillator signal 2 for the down-conversion processing, where the local oscillator signal 1 and the local oscillator signal 2 are generated after the splitting processing by the first splitter 120; in addition, power of the local oscillator signal before and after the splitting processing by the first splitter 120 may be the same or different, which is not specifically limited in the present invention.

C. Up-Converter 130

In the embodiment of the present invention, the up-converter 130, or referred to as an up-mixer, has two input ports, that is, the first input port 132 and the second input port 134, where the first input port 132 of the up-converter 130 is connected to the first output port 122 of the foregoing first splitter 120, so that the up-converter 130 can receive the local oscillator signal 1 from the first splitter 120.

In addition, the baseband transmit signal is input into the second input port 134 of the up-converter 130.

Therefore, the up-converter 130 can acquire the baseband transmit signal and the local oscillator signal 1.

Therefore, the up-converter 130 can perform, based on the local oscillator signal 1, the up-conversion processing (may also be referred to as mixing processing) on the baseband transmit signal. It should be noted that in the embodiment of the present invention, a method and a process in which the up-converter 130 performs up-conversion processing on a signal may be similar to those in the prior art. To avoid a repeated description, a description about the method and the process is herein omitted.

The to-be-transmitted radio frequency transmit signal generated after the up-conversion processing by the up-converter 130 may be sent to a component, for example, a band-pass filter, a power amplifier, or a transmit antenna, and then be further transmitted to external space. It should be noted that a process in which the foregoing band-pass filter, the power amplifier, and the transmit antenna process a signal may be similar to that in the prior art. To avoid a repeated description, a description about the process is herein omitted. In addition, in the embodiment of the present invention, the foregoing to-be-transmitted radio frequency transmit signal may be processed by another component according to a requirement, which is not specifically limited in the present invention.

D. Delayer 140

The delayer 140 receives the local oscillator signal 2 from the first splitter 120 (specifically, the second output port 124 of the first splitter 120) by using the input port of the delayer 140.

Because there is a delay between a process of acquiring the radio frequency transmit signal after the conversion processing is performed on the baseband transmit signal and a process of acquiring the baseband receive signal after the down-conversion processing is performed on the radio frequency receive signal (the process of acquiring the baseband receive signal will be described later), before the down-conversion processing is performed on the radio frequency receive signal by using the local oscillator signal 2, the delayer 140 needs to perform the delaying processing on the local oscillator signal 2, and then transmits, by using the output port of the delayer 140, the local oscillator signal 2 obtained after the delaying processing to the down-converter 150 (specifically, the first input port 152 of the down-converter 150).

Optionally, the target delay is determined according to a first delay, a second delay, and a third delay, where the first delay is a processing delay after the up-conversion processing in a transmit branch, the second delay is a processing delay before the down-conversion processing in a receive branch, and the third delay is an average delay of a multipath signal from the transmit antenna to the receive antenna.

Specifically, in the embodiment of the present invention, compared with the local oscillator signal 1, the local oscillator signal 2 obtained after the processing by the delayer 140 has a relative delay, where the relative delay is equal to the sum of a delay of components (for example, including radio frequency components such as a power amplifier) after the up-conversion processing in the transmit branch, a delay of components (for example, radio frequency components such as an LNA) before the down-conversion processing in the receive branch, and the average delay of the multipath signal from the transmit antenna to the receive antenna. In addition, in the embodiment of the present invention, the delays of the foregoing components may be measured by a specialized instrument. Therefore, in the embodiment of the present invention, the "processing delay after the up-conversion processing" may be the delay of the components (for example, including radio frequency components such as a power amplifier) after the up-conversion in the transmit branch, and the "processing delay before the down-conversion processing" may be the delay of the components (for example, radio frequency components such as an LNA) before the down-conversion in the receive branch.

E. First Down-Converter 150

In the embodiment of the present invention, the first down-converter 150, or referred to as a down-mixer, has two input ports, that is, the first input port 152 and the second input port 154, where the first input port 152 of the first down-converter 150 is connected to the second output port 124 of the foregoing first splitter 120 by using the delayer 140, so that the first down-converter 150 can receive the local oscillator signal 2 that comes from the first splitter 120 and that is obtained after the delaying processing by the delayer 140.

In addition, a received signal is input into the second input port 154 of the first down-converter 150.

In the embodiment of the present invention, the radio frequency receive signal is a signal received by the receive antenna, and the receiving process may be similar to a process in which an antenna receives a signal in the prior art. To avoid a repeated description, a description about the process is herein omitted. In addition, the radio frequency receive signal may also be a signal obtained after processing by the radio frequency components such as the LNA, which is not specifically limited in the present invention.

Therefore, the first down-converter 150 can acquire the baseband receive signal and the local oscillator signal 2.

Therefore, the first down-converter 150 can perform, based on the local oscillator signal 2, the down-conversion processing (may also be referred to as mixing processing) on the radio frequency receive signal. It should be noted that in the embodiment of the present invention, a method and a process in which the first down-converter 150 performs down-conversion processing on a signal may be similar to those in the prior art. To avoid a repeated description, a description about the method and the process is herein omitted.

The baseband receive signal generated after the down-conversion processing by the first down-converter 150 may be sent to a component, for example, a low-pass filter or an ADC, to obtain a digital-domain baseband receive signal. It should be noted that a process in which the foregoing low-pass filter or ADC processes a signal may be similar to that in the prior art. To avoid a repeated description, a description about the process is herein omitted. In addition, in the embodiment of the present invention, the foregoing baseband receive signal may be processed by another component according to a requirement, which is not specifically limited in the present invention.

F. Self-Interference Canceller 190

In the embodiment of the present invention, the self-interference canceller 190 may perform the self-interference cancellation processing in two manners on the baseband receive signal obtained as shown above. The following separately describes structures and processing processes in the two manners.

Manner 1

Optionally, the self-interference canceller 190 is specifically configured to acquire, based on the baseband transmit signal (specifically, a digital reference signal acquired based on the baseband transmit signal), an estimation of a baseband self-interference signal in the baseband receive signal, and cancel the baseband self-interference signal in the baseband receive signal by using the estimation of the baseband self-interference signal.

Herein, in the embodiment of the present invention, a process of acquiring, based on the baseband transmit signal, the digital reference signal may be similar to that in the prior art. To avoid a repeated description, a description about the process is herein omitted.

In the following, for ease of understanding and differentiation, the self-interference canceller 190 in manner 1 is denoted as a self-interference canceller 190'.

Figure 3:
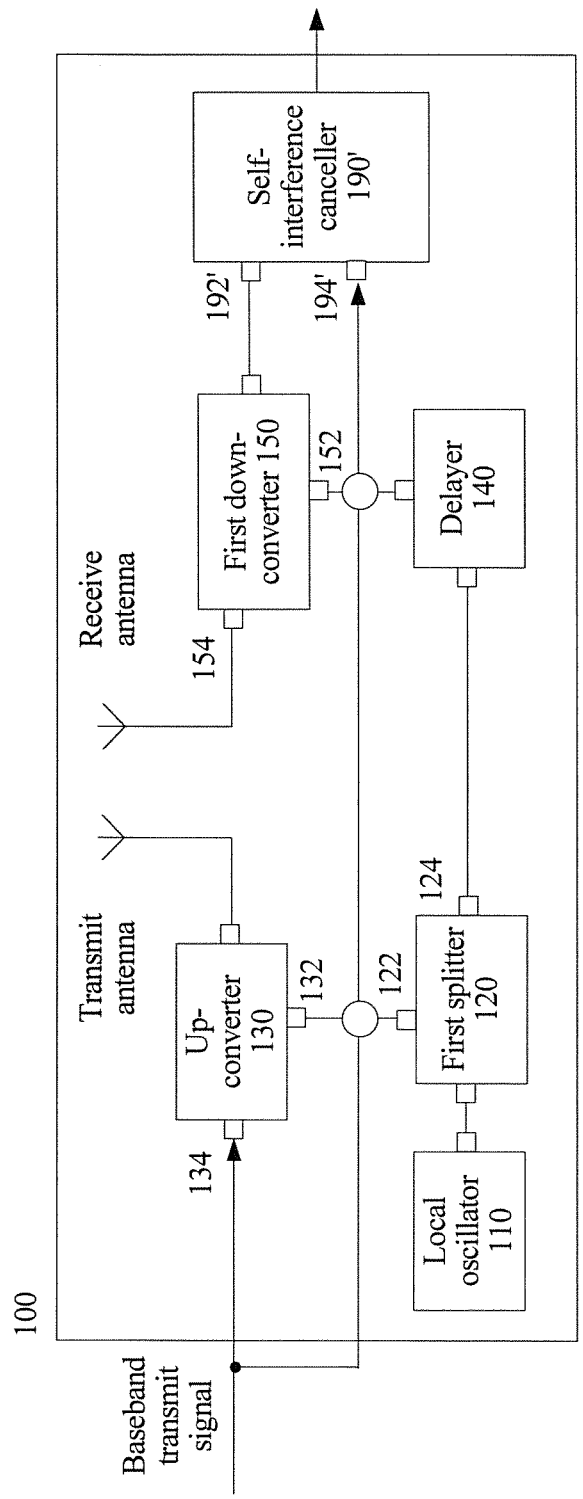
FIG. 3 is a schematic structural diagram of an apparatus for self-interference cancellation according to another embodiment of the present invention.

As shown in FIG. 3, in the embodiment of the present invention, a first input port 192' of the self-interference canceller 190' is connected to the output port of the first down-converter 150, and the self-interference canceller 190' acquires the baseband transmit signal (or, the digital reference signal) from the transmit branch by using a second input port 194' of the self-interference canceller 190'. It should be noted that the baseband transmit signal is a digital-domain signal on which up-conversion processing is not performed. Therefore, the self-interference canceller 190' may estimate a self-interference channel by using a channel estimation technology (for example, a pilot-based frequency-domain channel estimation technology). The self-interference canceller 190' inputs the baseband transmit signal into, for example, a time-domain or frequency-domain digital filter, performs processing on the baseband transmit signal by using the estimated self-interference channel to obtain an estimation of a baseband self-interference signal in a baseband receive signal, and then can cancel the self-interference signal in the baseband receive signal by using the estimation of the self-interference signal. In the embodiment of the present invention, according to a relationship between the estimation of the baseband self-interference signal and an actual self-interference signal, the cancellation may be properly changed, for example, adding or subtracting, which is not specifically limited in the present invention.

It should be understood that the foregoing enumerated method and process in which self-interference cancellation processing is performed, based on the baseband transmit signal, on the baseband receive signal are only an exemplary description, and the present invention is not limited thereto. For example, parameters used for a self-interference channel estimation (or, a self-interference signal estimation) may be adjusted, based on output of the self-interference canceller 190, in a manner of minimizing strength (or power or energy) of a signal that is output by the self-interference canceller 190. In addition, the foregoing enumerated manner of adjusting the parameters is only an exemplary description, and the present invention is not limited thereto. Provided that the strength of the signal that is output by the self-interference canceller 190 is less than that of the input baseband receive signal, an effect of self-interference cancellation can be achieved.

Manner 2

Optionally, the apparatus further includes:

a second splitter 160, a third splitter 170, and a second down-converter 180. The output port of the delayer 140 is indirectly connected to the first input port 152 of the first down-converter 150 by using the second splitter 160; the output port of the delayer 140 is connected to an input port of the second splitter 160; a first output port 162 of the second splitter 160 is connected to the first input port 152 of the first down-converter 150; a second output port 164 of the second splitter 160 is connected to a first input port 182 of the second down-converter 180; the output port of the up-converter 130 is indirectly connected to the transmit antenna by using the third splitter 170; the output port of the up-converter 130 is connected to an input port of the third splitter 170; a first output port 172 of the third splitter 170 is connected to the transmit antenna; a second output port 174 of the third splitter 170 is connected to a second input port 184 of the second down-converter 180; and a second input port 194 of the self-interference canceller 190 is connected to an output port of the second down-converter 180.

The second splitter 160 is configured to acquire, from the delayer 140, the local oscillator signal 2 obtained after the delaying processing, and perform splitting processing on the local oscillator signal 2 obtained after the delaying processing to separately transmit the local oscillator signal obtained after the delaying processing to the first down-converter 150 and the second down-converter 180.

The third splitter 170 is configured to acquire the radio frequency transmit signal from the up-converter 130, acquire a radio frequency reference signal according to the radio frequency transmit signal, send the radio frequency transmit signal to the transmit antenna, and send the radio frequency reference signal to the second down-converter 180.

The second down-converter 180 is configured to perform, based on the local oscillator signal obtained after the delaying processing, down-conversion processing on the radio frequency reference signal to acquire a baseband reference signal, and send the baseband reference signal to the self-interference canceller 190.

The self-interference canceller 190 is specifically configured to perform, based on the baseband reference signal, self-interference cancellation processing on the baseband receive signal.

Figure 4:
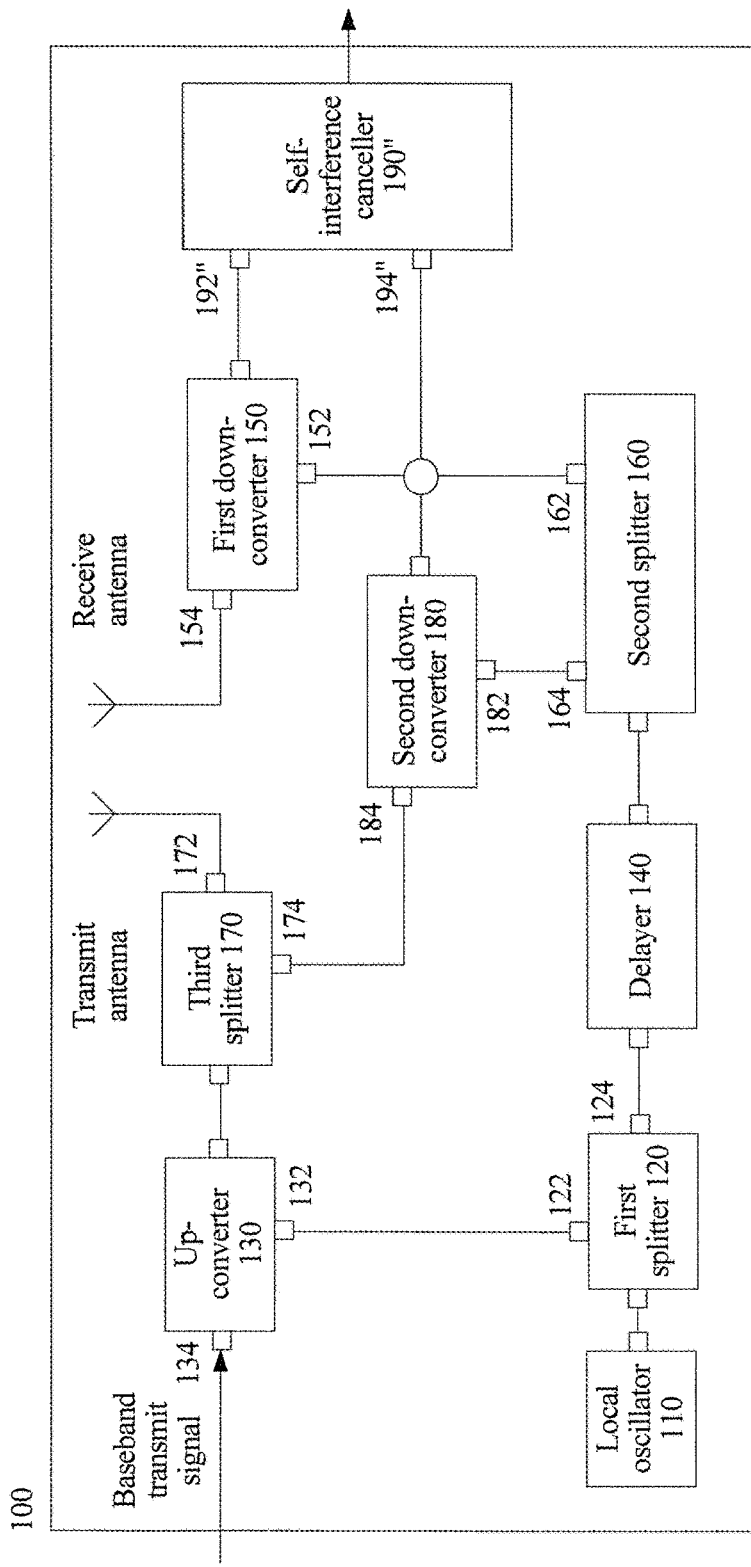
FIG. 4 is a schematic structural diagram of an apparatus for self-interference cancellation according to still another embodiment of the present invention.

With reference to FIG. 4, the following describes in detail a connection relationship, structures, and functions of other components in the apparatus 100 in manner 2. In addition, in FIG. 4, a same reference numeral is given to a component that is the same as that in FIG. 1, where a description about the component is omitted.

G. Second Splitter 160

The second splitter 160 receives the local oscillator signal 2 from the delayer 140 by using the input port (not shown in the figure) of the second splitter 160, and performs splitting processing on the local oscillator signal 2 to split the local oscillator signal 2 into two signals, where one signal is used as a local oscillator signal (for ease of understanding, denoted as a local oscillator signal 2A in the following) for the down-conversion processing on the radio frequency receive signal, and is transmitted to the down-converter 150 (specifically, the first input port 152 of the first down-converter 150) by using the first output port 162 of the second splitter 160; and the other signal is used as a local oscillator signal (for ease of understanding, denoted as a local oscillator signal 2B in the following) for the down-conversion processing on the radio frequency reference signal (the following describes in detail a process of acquiring the radio frequency reference signal), and is transmitted to the second down-converter 180 (specifically, the first input port 182 of the second down-converter 180) by using the second output port 164 of the second splitter 160.

In the embodiment of the present invention, as an example instead of a limitation, for example, a coupler or a power divider may be used as the second splitter 160.

It should be noted that in the embodiment of the present invention, power of the local oscillator signal 2A may be the same as or different from that of the local oscillator signal 2B, where the local oscillator signal 2A and the local oscillator signal 2B are generated after the splitting processing by the second splitter 160; in addition, and power of the local oscillator signal before and after the splitting processing by the second splitter 160 may be the same or different, which is not specifically limited in the present invention.

In addition, a process in manner 2 in which the first down-converter 150 performs, based on the local oscillator signal 2A, down-conversion processing on the radio frequency receive signal is similar to a process in manner 1 in which the first down-converter 150 performs, based on the local oscillator signal 2, the down-conversion processing on the radio frequency receive signal. To avoid a repeated description, a description about the process is herein omitted.

H. Third Splitter 170

Specifically, in the embodiment of the present invention, for example, a coupler or a power divider may be used as the third splitter 170.

In addition, for example, a signal after being processed by the up-converter 130 and the power amplifier in FIG. 1 may be used as the radio frequency transmit signal and is input into the third splitter 170.

Therefore, the third splitter 170 may split the radio frequency transmit signal into two, where one signal is used as a to-be-transmitted signal and is transmitted to the transmit antenna by using the first output port 172 of the third splitter 170; and the other signal is used as a radio frequency reference signal and is transmitted to the following second down-converter 180 (specifically, the second input port 184 of the second down-converter 180) by using the second output port 174 of the third splitter 170.

It should be noted that in the embodiment of the present invention, power of the foregoing radio frequency transmit signal may be the same as or different from that of the foregoing radio frequency reference signal, which is not specifically limited in the present invention.

The coupler or the power divider is used as the third splitter 170, so that a waveform of the radio frequency reference signal that is output by the third splitter 170 can be the same as that of the to-be-transmitted signal, and main-path interference processing based on the reference signal is facilitated.

It should be understood that the foregoing enumerated coupler and power divider that are used as the third splitter 170 are only an exemplary description, and the present invention is not limited thereto. Another apparatus that can make similarity between the waveform of the reference signal and the waveform of the transmit signal be in a preset range falls within the protection scope of the present invention.

I. Second Down-Converter 180

In the embodiment of the present invention, the second down-converter 180, or referred to as a down-mixer, has two input ports, that is, the first input port 182 and the second input port 184, where the first input port 182 of the second down-converter 180 is connected to the second output port 164 of the foregoing second splitter 160. Therefore, the second down-converter 180 can receive the local oscillator signal 2B from the second splitter 160.

In addition, the foregoing reference signal is input into the second input port 184 of the second down-converter 180.

Therefore, the second down-converter 180 can acquire the radio frequency reference signal and the local oscillator signal 2B.

Therefore, the second down-converter 180 can perform, based on the local oscillator signal 2B, the down-conversion processing (may also be referred to as mixing processing) on the radio frequency reference signal. It should be noted that in the embodiment of the present invention, a method and a process in which the second down-converter 180 performs down-conversion processing on a signal may be similar to those in the prior art. To avoid a repeated description, a description about the method and the process is herein omitted.

The baseband reference signal generated after the down-conversion processing by the second down-converter 180 may be sent to a component, for example, a low-pass filter or an ADC to obtain a digital-domain baseband reference signal. It should be noted that a process in which the foregoing low-pass filter or ADC processes a signal may be similar to that in the prior art. To avoid a repeated description, a description about the process is herein omitted. In addition, in the embodiment of the present invention, the foregoing baseband reference signal may be processed by another component according to a requirement, which is not specifically limited in the present invention.

Optionally, the self-interference canceller 190 is specifically configured to acquire, based on the baseband reference signal, an estimation of a baseband self-interference signal in the baseband receive signal, and cancel the baseband self-interference signal in the baseband receive signal by using the estimation of the baseband self-interference signal.

In the following, for ease of understanding and differentiation, the self-interference canceller 190 in manner 2 is denoted as a self-interference canceller 190".

Specifically, in the embodiment of the present invention, the self-interference canceller 190" has two input ports.

A first input port 192" of the self-interference canceller 190" is connected to the output port of the first down-converter 150, and the self-interference canceller 190" acquires the foregoing baseband reference signal by using a second input port 194" of the self-interference canceller 190". It should be noted that the baseband reference signal is a digital-domain signal obtained after the down-conversion processing by the foregoing second down-converter 180.

Therefore, the self-interference canceller 190" estimates a self-interference channel by using a channel estimation technology (for example, a pilot-based frequency-domain channel estimation technology). The self-interference canceller 190" inputs the baseband reference signal into, for example, a time-domain or frequency-domain digital filter, performs processing on the baseband reference signal by using the estimated self-interference channel to obtain the estimation of the baseband self-interference signal in the baseband receive signal, and then can cancel the self-interference signal in the baseband receive signal by using the estimation of the self-interference signal. In the embodiment of the present invention, according to a relationship between the estimation of the baseband self-interference signal and an actual self-interference signal, the cancellation may be properly changed, for example, adding or subtracting, which is not specifically limited in the present invention.

It should be understood that the method and the process that are enumerated above and in which self-interference cancellation processing is performed, based on the baseband transmit signal, on the baseband receive signal are only an exemplary description, and the present invention is not limited thereto. For example, parameters used for a self-interference channel estimation (or, a self-interference signal estimation) may be adjusted, based on output of the self-interference canceller 190", in a manner of minimizing strength (or power or energy) of a signal that is output by the self-interference canceller 190". In addition, the foregoing enumerated manner of adjusting the parameters is only an exemplary description, and the present invention is not limited thereto.

Provided that the strength of the signal that is output by the self-interference canceller 190" is less than that of the input baseband receive signal, an effect of self-interference cancellation can be achieved.

In manner 2, the radio frequency transmit signal from the transmit branch is acquired and used as the radio frequency reference signal, and the down-conversion processing is performed on the radio frequency reference signal to acquire the baseband reference signal. Therefore, the baseband reference signal that includes non-linear impact from a power amplifier and the like may be directly obtained, and the self-interference cancellation processing is performed on the baseband receive signal by using the baseband reference signal, thereby canceling the non-linear impact.

According to the apparatus for self-interference cancellation shown in the foregoing manner 1 and manner 2 in the embodiment of the present invention, the baseband transmit signal is supposed to be s(t) and is modulated, after being processed by components such as an up-mixer and a band-pass filter, onto a radio frequency carrier provided by a transmitter local oscillator $LO_1$. In this case, a radio frequency transmit signal $s_1(t)$ generated after the foregoing modulation may be indicated as $s_1(t)=s(t)e^{j[\omega t+\varphi_{Tx}(t)]}$, where $\varphi_{Tx}(t)$ is a phase noise of the transmitter local oscillator $LO_1$. Then, the radio frequency signal obtained after power amplification is transmitted to an exterior by the transmit antenna. In this case, a transmit signal $s_2(t)$ that is transmitted to the exterior may be indicated as:

$$s_2(t)=g[s(t)]e^{j[\omega t+\varphi_{Tx}(t)]}, \qquad \text{formula (1)},$$

where a function g(•) represents non-linearity of power amplification. In wireless full-duplex communications, a local transmit signal is input into a receiver by using the receive antenna, which causes strong interference to the receiver. As shown above, after self-interference cancellation processing is performed in an antenna part and a radio frequency part, a residual radio frequency self-interference signal after being processed by components at a receive end such as an LNA, a down-mixer, a low-pass filter, and an ADC becomes a self-interference element $s_3(t)$ of the baseband receive signal. $s_3(t)$ may be indicated as:

$$s_3(t) = \{[g[s(t)]e^{j\varphi_{Tx}(t)}] * h(t)\} \cdot e^{-j\varphi_{Rx}(t)} = \sum_i g[s(t-\tau_i)]e^{j[\varphi_{Tx}(t-\tau_i)-\varphi_{Rx}(t)]}h(\tau_i),$$ formula (2), where $\varphi_{Rx}(t)$ is a phase noise of a receiver local oscillator $LO_2$, and $h(t)$ is a baseband model of a radio channel.

It can be seen from formula (2) that the self-interference signal in the baseband receive signal is not a delayed duplicate of the baseband transmit signal $s(t)$, but is affected by factors such as non-linearity and a phase noise of a radio frequency channel in a system. The non-linearity of the radio frequency channel is inherent on a receive/transmit channel, changes slowly over time, and is easy to estimate and compensate. For example, the non-linear function $g(\cdot)$ may be estimated by using the radio frequency reference signal to obtain an estimation of $g[s(t)]$.

However, the phase noise is a random signal. Especially in a cellular mobile communications frequency band, the phase noise has a coherence time at microsecond level (a bandwidth of a typical power spectrum is at a level of hundreds of KHz), and changes relatively rapidly. For example, in an LTE system, a length of one OFDM symbol is approximately 70 microseconds, and phase noises of OFDM symbols are random and unrelated. Therefore, generally, it is relatively difficult to estimate by using a reference symbol.

Generally, a power spectrum of a phase noise is relatively narrow, that is, in a radio-frequency band, a typical phase noise is at a level of hundreds of KHz, where a coherence time of the phase noise is at microsecond level.

Because generally, a delay $\tau_i$ of a self-interference signal whose interference power is relatively high and that returns to the receive end after multipath reflections is relatively small (for example, less than 100 ns), and in the embodiment of the present invention, the receiver local oscillator $LO2$ and the transmitter local oscillator $LO$ come from a same local oscillator source, approximately, $\varphi_{Tx}(t-\tau_i)-\varphi_{Rx}(t)\approx 0$, and formula (2) may be simplified as:

$$s_3(t) \approx \sum_i [g[s(t-\tau_i)]h(\tau_i)] = g[s(t-\tau_i)] * h(t),$$ formula (3).

Therefore, a baseband self-interference signal shown in formula (3) does not include a phase noise anymore.

It can be seen from above that according to the apparatus for self-interference cancellation in the embodiment of the present invention, up-conversion processing on a baseband transmit signal and down-conversion processing on a radio frequency receive signal are performed based on local oscillator signals generated by a same oscillator source, and self-interference signal cancellation is performed, according to the baseband transmit signal or a baseband reference signal, on a baseband receive signal generated after the down-conversion processing, which can effectively eliminate impact of a phase noise of a radio frequency channel in a system on performance of self-interference cancellation, thereby improving the performance of the self-interference cancellation.

Figure 5:
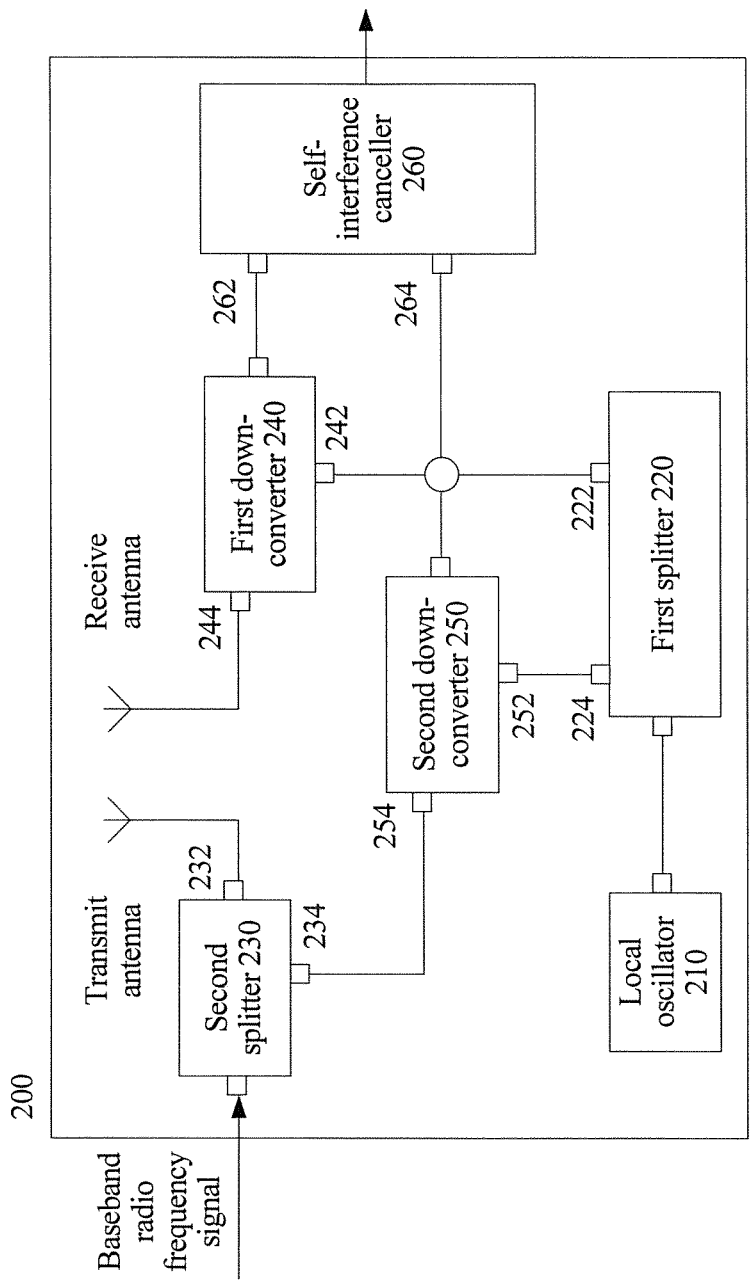
FIG. 5 is a schematic structural diagram of an apparatus for self-interference cancellation according to still another embodiment of the present invention.

FIG. 5 is a schematic structural diagram of an apparatus 200 for self-interference cancellation according to an embodiment of the present invention. As shown in FIG. 4, the apparatus 200 includes:

a local oscillator 210, a first splitter 220, a second splitter 230, a first down-converter 240, a second down-converter 250, and a self-interference canceller 260. An output port of the local oscillator 210 is connected to an input port of the first splitter 220; a first output port 222 of the first splitter 220 is connected to a first input port 242 of the first down-converter 240; a second output port 224 of the first splitter 220 is connected to a first input port 252 of the second down-converter 250; a second input port 244 of the first down-converter 240 is connected to a receive antenna; an output port of the first down-converter 240 is connected to a first input port 262 of the self-interference canceller 260; a first output port 232 of the second splitter 230 is connected to a transmit antenna; a second output port 234 of the second splitter 230 is connected to a second input port 254 of the second down-converter 250; and an output port of the second down-converter 250 is connected to a second input port 264 of the self-interference canceller 260.

The local oscillator 210 is configured to generate a local oscillator signal and transmit the local oscillator signal to the first splitter 220.

The first splitter 220 is configured to perform splitting processing on the local oscillator signal to separately transmit the local oscillator signal to the first down-converter 240 and the second down-converter 250.

The first down-converter 240 is configured to acquire a radio frequency receive signal from the receive antenna, perform, based on the local oscillator signal, down-conversion processing on the radio frequency reference signal to acquire a baseband receive signal, and send the baseband receive signal to the self-interference canceller 260.

The second splitter 230 is configured to acquire a radio frequency reference signal according to a radio frequency transmit signal, send the radio frequency transmit signal to the transmit antenna, and send the radio frequency reference signal to the second down-converter 250.

The second down-converter 250 is configured to perform down-conversion processing, based on the local oscillator signal, on the radio frequency reference signal to acquire a baseband reference signal, and send the baseband reference signal to the self-interference canceller 260.

The self-interference canceller 260 is configured to perform self-interference cancellation processing on the baseband receive signal according to the baseband reference signal.

The following separately describes in detail a connection relationship, structures, and functions of the components.

J. Local Oscillator 110

As a local oscillator source used for the down-conversion processing in the embodiment of the present invention, the local oscillator 210 is also referred to as an oscillator and is configured to generate a local oscillator signal (also referred to as a carrier signal). In addition, in the embodiment of the present invention, as an example instead of a limitation, for example, a voltage-controlled oscillator (VCO) may be used as the local oscillator 210.

After generating a local oscillator signal, the local oscillator 110 sends the local oscillator signal to the input port of the first splitter 220 by using the output port (not shown in the figure) of the local oscillator 210.

In the embodiment of the present invention, a method and a process in which the local oscillator 210 generates the local oscillator signal may be similar to those in the prior art. To avoid a repeated description, a description about the method and the process is herein omitted.

K. First Splitter 220

The first splitter 220 receives the local oscillator signal from the local oscillator 210 by using the input port (not shown in the figure) of the first splitter 220, and performs splitting processing on the local oscillator signal to split the local oscillator signal into two signals, where one signal is used as a local oscillator signal (for ease of understanding, denoted as a local oscillator signal A in the following) for down-conversion processing on a receive signal (the following describes a process of acquiring the signal) and is transmitted to the first down-converter 240 (specifically, the first input port 242 of the first down-converter 240) by using the first output port 222 of the first splitter 220; and the other signal is used as a local oscillator signal (for ease of understanding, denoted as a local oscillator signal B in the following) for down-conversion processing on a reference signal (the following describes a process of acquiring the signal), and is transmitted to the second down-converter 250 (specifically, the first input port 252 of the second down-converter 250) by using the second output port 224 of the first splitter 220.

In the embodiment of the present invention, as an example instead of a limitation, for example, a coupler or a power divider may be used as the first splitter 220.

It should be noted that in the embodiment of the present invention, power of the local oscillator signal A may be the same as or different from that of the local oscillator signal B, where the local oscillator signal A and the local oscillator signal B are generated after the splitting processing by the first splitter 220; in addition, power of the local oscillator signal before and after the splitting processing by the first splitter 220 may be the same or different, which is not specifically limited in the present invention.

L. First Down-Converter 240

In the embodiment of the present invention, the first down-converter 240, or referred to as an up-mixer, has two input ports, that is, the first input port 242 and the second input port 244, where the first input port 242 of the first down-converter 240 is connected to the first output port 222 of the foregoing first splitter 220, so that the first down-converter 240 can receive the local oscillator signal A from the first splitter 220.

In addition, the radio frequency receive signal is input into the second input port 244 of the first down-converter 240.

In the embodiment of the present invention, the radio frequency receive signal is a signal received by the receive antenna, and the receiving process may be similar to a process in which an antenna receives a signal in the prior art. To avoid a repeated description, a description about the process is herein omitted. In addition, the radio frequency receive signal may also be a signal obtained after processing by radio frequency components such as an LNA, which is not specifically limited in the present invention.

Therefore, the first down-converter 240 can acquire the receive signal and the local oscillator signal A.

Therefore, the first down-converter 240 can perform, based on the local oscillator signal A, the down-conversion processing (may also be referred to as mixing processing) on the radio frequency receive signal. It should be noted that in the embodiment of the present invention, a method and a process in which the first down-converter 240 performs down-conversion processing on a signal may be similar to those in the prior art. To avoid a repeated description, a description about the method and the process is herein omitted.

The baseband receive signal generated after the down-conversion processing by the first down-converter 240 may be sent to a component, for example, a low-pass filter or an ADC, to obtain a digital-domain baseband receive signal. It should be noted that a process in which the foregoing low-pass filter or ADC processes a signal may be similar to that in the prior art. To avoid a repeated description, a description about the process is herein omitted. In addition, in the embodiment of the present invention, the foregoing baseband receive signal may be processed by another component according to a requirement, which is not specifically limited in the present invention.

M. Second Splitter 230

Specifically, in the embodiment of the present invention, for example, a coupler or a power divider may be used as the second splitter 230.

In addition, a signal after being processed by, for example, a transmit digital signal processing module, a digital-to-analog conversion module, an up-conversion module, and a power amplification module is used as the radio frequency transmit signal and is input into the second splitter 230.

Therefore, the second splitter 230 may split the radio frequency transmit signal into two, where one signal is used as a to-be-transmitted signal and is transmitted to the transmit antenna by using the first output port 232 of the second splitter 230; and the other signal is used as the radio frequency reference signal and is transmitted to the following second down-converter 250 (specifically, the second input port 254 of the second down-converter 250) by using the second output port 234 of the second splitter 230.

It should be noted that in the embodiment of the present invention, power of the foregoing to-be-transmitted signal may be the same as or different from that of the foregoing radio frequency reference signal, which is not specifically limited in the present invention.

The coupler or the power divider is used as the second splitter 230, so that a waveform of the radio frequency reference signal that is output by the second splitter 230 can be the same as that of the to-be-transmitted signal, and main-path interference processing based on the reference signal is facilitated.

It should be understood that the foregoing enumerated coupler and power divider that are used as the second splitter 230 are only an exemplary description, and the present invention is not limited thereto. Another apparatus that can make similarity between the waveform of the reference signal and the waveform of the transmit signal be in a preset range falls within the protection scope of the present invention.

N. Second Down-Converter 250

In the embodiment of the present invention, the second down-converter 250, or referred to as a down-mixer, has two input ports, that is, the first input port 252 and the second input port 254, where the first input port 252 of the second down-converter 250 is connected to the second output port 224 of the foregoing first splitter 220, so that the second down-converter 250 can receive the local oscillator signal 2B from the first splitter 220.

In addition, the foregoing reference signal is input into the second input port 254 of the second down-converter 250.

Therefore, the second down-converter 250 can acquire the reference signal and the local oscillator signal 2B.

Therefore, the second down-converter 250 can perform, based on the local oscillator signal 2B, the down-conversion processing (may also be referred to as mixing processing) on the radio frequency reference signal. It should be noted that in the embodiment of the present invention, a method and a process in which the second down-converter 250 performs down-conversion processing on a signal may be similar to those in the prior art. To avoid a repeated description, a description about the method and the process is herein omitted.

The baseband reference signal generated after the down-conversion processing by the second down-converter 250 may be sent to a component, for example, a low-pass filter or an ADC to obtain a digital-domain baseband reference signal. It should be noted that a process in which the foregoing low-pass filter or ADC processes a signal may be similar to that in the prior art. To avoid a repeated description, a description about the process is herein omitted. In addition, in the embodiment of the present invention, the foregoing baseband reference signal may be processed by another component according to a requirement, which is not specifically limited in the present invention.

Optionally, the self-interference canceller 260 is specifically configured to perform an amplitude adjustment and a phase adjustment, based on the baseband receive signal, on the baseband reference signal, and combines the baseband receive signal with a baseband reference signal obtained after the amplitude adjustment and the phase adjustment to generate a target signal, where energy of the target signal is less than energy of the baseband receive signal.

Specifically, in the embodiment of the present invention, the first input port 262 of the self-interference canceller 260 is connected to the output port of the first down-converter 240, and the self-interference canceller 260 acquires the foregoing baseband reference signal by using the second input port 264 of the self-interference canceller 260. It should be noted that the baseband reference signal is a digital-domain signal obtained after the down-conversion processing by the foregoing second down-converter 250.

Therefore, the self-interference canceller 260 estimates a self-interference channel by using a channel estimation technology (for example, a pilot-based frequency-domain channel estimation technology). The self-interference canceller 260 inputs the baseband reference signal into, for example, a time-domain or frequency-domain digital filter, performs processing on the baseband reference signal by using the estimated self-interference channel to obtain an estimation of a baseband self-interference signal in the baseband receive signal, and then can cancel the self-interference signal in the baseband receive signal by using the estimation of the self-interference signal. In the embodiment of the present invention, according to a relationship between the estimation of the baseband self-interference signal and an actual self-interference signal, the cancellation may be properly changed, for example, adding or subtracting, which is not specifically limited in the present invention.

It should be understood that the foregoing enumerated method and process in which self-interference cancellation processing is performed, based on the baseband transmit signal, on the baseband receive signal are only an exemplary description, and the present invention is not limited thereto. For example, parameters used for a self-interference channel estimation (or, a self-interference signal estimation) may be adjusted, based on output of the self-interference canceller 260, in a manner of minimizing strength (or power or energy) of a signal that is output by the self-interference canceller 260. In addition, the foregoing enumerated manner of adjusting the parameters is only an exemplary description, and the present invention is not limited thereto. Provided that the strength of the signal that is output by the self-interference canceller 260 is less than that of the input baseband receive signal, an effect of self-interference cancellation can be achieved.

By using a receive branch of the reference signal, a transmit signal from a corresponding transmit branch is acquired, a reference signal that includes non-linear impact from a power amplifier and the like may be directly obtained, and the self-interference cancellation processing is performed on the receive signal by using the reference signal, thereby canceling the non-linear impact.

The baseband transmit signal is supposed to be s(t) and is modulated, after being processed by components such as an up-mixer and a band-pass filter, onto a radio frequency carrier provided by a transmitter local oscillator $LO_1$. In this case, a modulated radio frequency signal $s_1(t)$ may be indicated as $s_1(t)=s(t)e^{j[\omega t+\varphi_{Tx}(t)]}$, where $\varphi_{Tx}(t)$ is a phase noise of the transmitter local oscillator $LO_1$. Then, the radio frequency signal obtained after power amplification is transmitted to an exterior by the transmit antenna. In this case, the transmit signal $s_2(t)$ that is transmitted to the exterior may be indicated as:

$$s_2(t)=g[s(t)]e^{j[\omega t+\varphi_{Tx}(t)]}, \quad \text{formula (1)},$$

where a function g(•) represents non-linearity of power amplification. In wireless full-duplex communications, a local transmit signal is input into a receiver by using the receive antenna, which causes strong interference to the receiver. As shown above, after self-interference cancellation processing is performed in an antenna part and a radio frequency part, a residual radio frequency self-interference signal after being processed by components at a receive end such as an LNA, a down-mixer, a low-pass filter, and an ADC becomes a self-interference element $s_3(t)$ of the baseband receive signal. $s_3(t)$ may be indicated as:

$$s_3(t) = \{[g[s(t)]e^{j\varphi_{Tx}(t)}] * h(t)\} \cdot e^{-j\varphi_{Rx}(t)} = \quad \text{formula (2)},$$
$$\sum_i g[s(t-\tau_i)]e^{j[\varphi_{Tx}(t-\tau_i)-\varphi_{Rx}(t)]}h(\tau_i),$$

where $\varphi_{Rx}(t)$ is a phase noise of a receiver local oscillator $LO_2$, and h(t) is a baseband model of a radio channel.

It can be seen from formula (2) that the self-interference signal in the baseband receive signal is not a delayed duplicate of the baseband transmit signal s(t), but is affected by factors such as non-linearity and a phase noise of a radio frequency channel in a system. The non-linearity of the radio frequency channel is inherent on a receive/transmit channel, changes slowly over time, and is easy to estimate and compensate. For example, the non-linear function g(•) may be estimated by using a reference symbol to obtain an estimation of g[s(t)].

However, the phase noise is a random signal. Especially in a cellular mobile communications frequency band, the phase noise has a coherence time at microsecond level (a bandwidth of a typical power spectrum is at a level of hundreds of KHz), and changes relatively rapidly. For example, in an LTE system, a length of one OFDM symbol is approximately 70 microseconds, and phase noises of OFDM symbols are random and unrelated. Therefore, generally, it is relatively difficult to estimate by using a reference symbol.

Generally, a power spectrum of a phase noise is relatively narrow, that is, in a radio-frequency band, a typical phase noise is at a level of hundreds of KHz, where a coherence time of the phase noise is at microsecond level.

In the embodiment of the present invention, a power division unit divides output of the receiver local oscillator $LO_2$ into two signals that have same power and a same phase, where the two signals are separately used for down-conversion in the receive branch of the reference signal and that in the receive branch of an antenna signal. Because the receive branch of the reference signal is directly obtained from the transmit end, a channel characteristic of the receive branch of the reference signal is approximately a constant, and the baseband reference signal may be indicated as:

$$s_{ref}(t)g[s(t)]e^{j[\varphi_{Tx}(t)-\varphi_{Rx}(t)]}, \quad \text{formula (4).}$$

Therefore, the following formula (5) may be obtained:

$$g[s(t)]=s_{ref}(t)e^{j[\varphi_{Rx}(t)-\varphi_{Tx}(t)]}, \quad \text{formula (5).}$$

As shown in formula (2), a baseband receive signal received in the receive branch of the antenna signal may be further written as the following formula (6):

$$s_3(t) = \sum_i g[s(t-\tau_i)]e^{j[\varphi_{Tx}(t-\tau_i)-\varphi_{Rx}(t)]}h(\tau_i) \quad \text{formula (6).}$$

$$= \sum_i s_{ref}(t-\tau_i)e^{j[\varphi_{Rx}(t-\tau_i)-\varphi_{Tx}(t)]} \cdot e^{j[\varphi_{Tx}(t-\tau_i)-\varphi_{Rx}(t)]}h(\tau_i)$$

$$= \sum_i s_{ref}(t-\tau_i)e^{j[\varphi_{Rx}(t-\tau_i)-\varphi_{Rx}(t)]}h(\tau_i),$$

Therefore, a signal $s_{ref}(t)$ shown in formula (4) is used as the baseband reference signal, and the phase noise of the transmitter local oscillator does not affect the estimation of the self-interference signal in the antenna receive signal anymore. Generally, a delay $\tau_i$ of a self-interference signal whose interference power is relatively high and that returns to the receive end after a multipath reflection is relatively small (for example, less than 100 ns). Therefore, approximately, $\varphi_{Rx}(t-\tau_i)-\varphi_{Rx}(t)\approx 0$, and formula (6) may be further simplified as:

$$s_3(t) \approx \sum_i s_{ref}(t-\tau_i)h(\tau_i) = s_{ref}(t) * h(t), \quad \text{formula (7).}$$

In this case, impact of the phase noise of the receive end local oscillator and the non-linearity of the receive/transmit channel on the self-interference signal in the antenna receive signal may be omitted.

It can be seen from above that according to the apparatus for self-interference cancellation in the embodiment of the present invention, down-conversion processing on the radio frequency receive signal and the radio frequency reference signal is performed based on local oscillator signals generated by a same oscillator source, and self-interference signal cancellation is performed, according to the baseband reference signal generated after the down-conversion processing, on a baseband receive signal generated after the down-conversion processing, which can effectively eliminate impact of the phase noise of the radio frequency channel in a system on performance of self-interference cancellation, thereby improving the performance of the self-interference cancellation.

In addition, it should be noted that in the embodiment shown in FIG. 2 to 4, a case in which different antennas are used for reception and transmission is shown. However, the present invention is not limited thereto and may also be applicable to a case in which a same antenna is used for reception and transmission.

Figure 6:
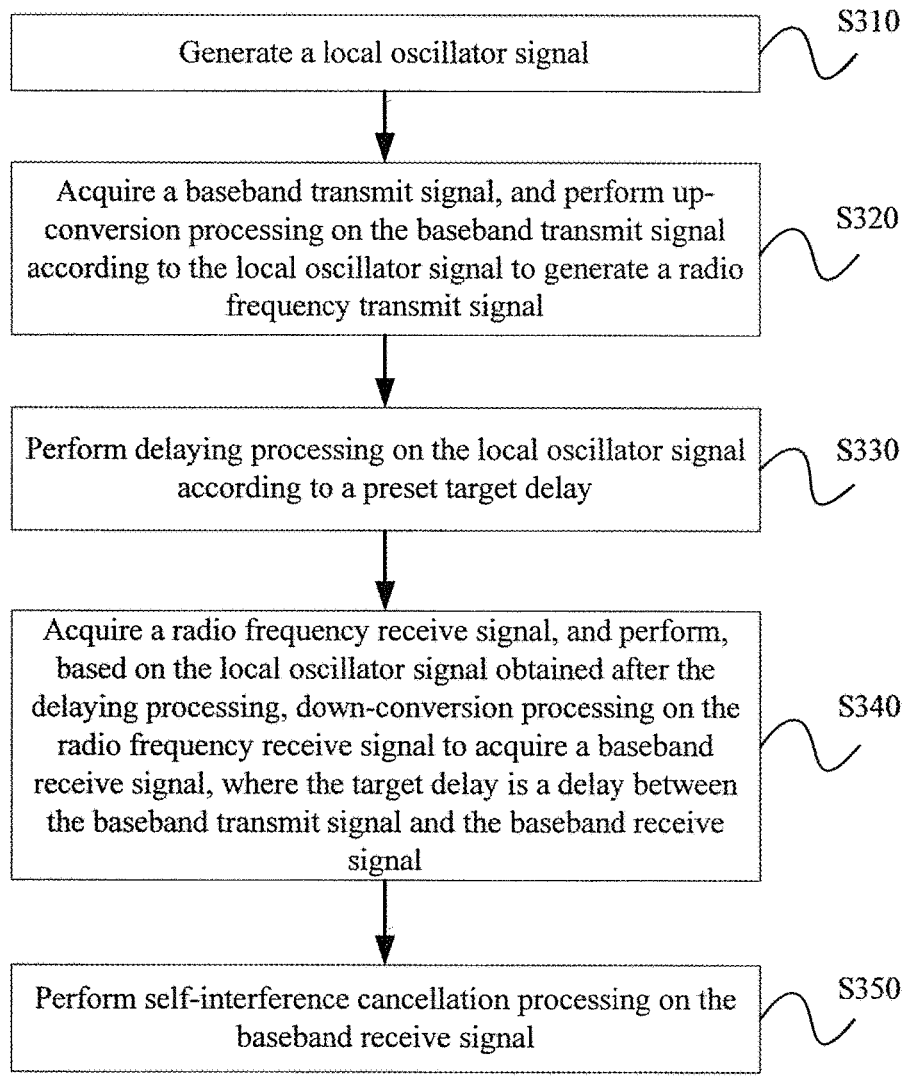
FIG. 6 is a schematic flowchart of a method for self-interference cancellation according to an embodiment of the present invention.
Figure 7:
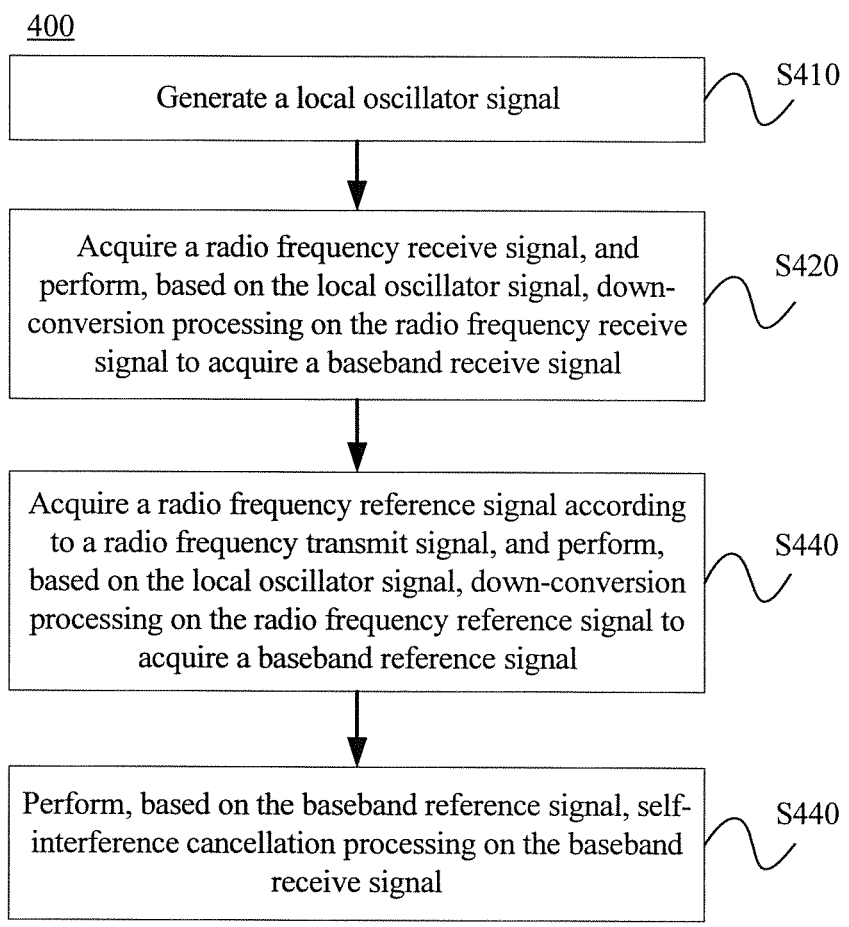
FIG. 7 is a schematic flowchart of a method for self-interference cancellation according to another embodiment of the present invention.

With reference to FIG. 1 to FIG. 4, the foregoing describes in detail the apparatus for self-interference cancellation in the embodiment of the present invention. With reference to FIG. 5 and FIG. 6, the following describes in detail a method for self-interference cancellation in the embodiment of the present invention.

FIG. 5 shows a schematic flowchart of a method 300 for self-interference cancellation according to an embodiment of the present invention. As shown in FIG. 5, the method 300 includes:

S310. Generate a local oscillator signal.

S320. Acquire a baseband transmit signal, and perform up-conversion processing on the baseband transmit signal according to the local oscillator signal to generate a radio frequency transmit signal.

S330. Perform delaying processing on the local oscillator signal according to a preset target delay.

S340. Acquire a radio frequency receive signal, and perform, based on the local oscillator signal obtained after the delaying processing, down-conversion processing on the radio frequency receive signal to acquire a baseband receive signal, where the target delay is a delay between the baseband transmit signal and the baseband receive signal.

S350. Perform self-interference cancellation processing on the baseband receive signal.

Optionally, the performing self-interference cancellation processing on the baseband receive signal includes:

acquiring, based on the baseband transmit signal, an estimation of a baseband self-interference signal in the baseband receive signal, and canceling the baseband self-interference signal in the baseband receive signal by using the estimation of the baseband self-interference signal.

In specific implementation, the "acquiring, based on the baseband transmit signal, an estimation of a baseband self-interference signal in the baseband receive signal" may be estimating a self-interference channel by using a channel estimation technology (for example, a pilot-based frequency-domain channel estimation technology). The baseband transmit signal is input into, for example, a time-domain or frequency-domain digital filter, processing is performed on the baseband transmit signal by using the estimated self-interference channel to obtain the estimation of the baseband self-interference signal in the baseband receive signal, and then the self-interference signal in the baseband receive signal can be cancelled by using the estimation of the self-interference signal. In the embodiment of the present invention, according to a relationship between the estimation of the baseband self-interference signal and an actual self-interference signal, the cancellation may be properly changed, for example, adding or subtracting, which is not specifically limited in the present invention.

Optionally, the method 300 further includes:

acquiring a radio frequency reference signal according to the radio frequency transmit signal; and performing, based on the local oscillator signal obtained after the delaying processing, down-conversion processing on the radio frequency reference signal to acquire a baseband reference signal; and the performing self-interference cancellation processing on the baseband receive signal includes:

performing, based on the baseband reference signal, self-interference cancellation processing on the baseband receive signal.

Optionally, the performing, based on the baseband reference signal, self-interference cancellation processing on the baseband receive signal includes:

acquiring, based on the baseband reference signal, an estimation of a baseband self-interference signal in the baseband receive signal, and canceling the baseband self-interference signal in the baseband receive signal by using the estimation of the baseband self-interference signal.

In specific implementation, the "acquiring, based on the baseband reference signal, an estimation of a baseband self-interference signal in the baseband receive signal" may be estimating a self-interference channel by using a channel estimation technology (for example, a pilot-based frequency-domain channel estimation technology). The baseband reference signal is input into, for example, a time-domain or frequency-domain digital filter, processing is performed on the baseband transmit signal by using the estimated self-interference channel to obtain the estimation of the baseband self-interference signal in the baseband receive signal, and then the self-interference signal in the baseband receive signal can be cancelled by using the estimation of the self-interference signal. In the embodiment of the present invention, according to a relationship between the estimation of the baseband self-interference signal and an actual self-interference signal, the cancellation may be properly changed, for example, adding or subtracting, which is not specifically limited in the present invention.

Optionally, the target delay is determined according to a first delay, a second delay, and a third delay, where the first delay is a processing delay after the up-conversion processing in a transmit branch, the second delay is a processing delay before the down-conversion processing in a receive branch, and the third delay is an average delay of a multipath signal from a transmit antenna to a receive antenna.

It should be noted that in the embodiment of the present invention, the "processing delay after the up-conversion processing" may be a delay of components (for example, including radio frequency components such as a power amplifier) after the up-conversion in the transmit branch, and the "processing delay before the down-conversion processing" may be a delay of components (for example, radio frequency components such as an LNA) before the down-conversion in the receive branch.

According to the embodiment of the present invention, the method 300 for self-interference cancellation may be executed by the apparatus 100 shown in FIG. 2, and steps are respectively corresponding to processing by components in the apparatus 100. To avoid a repeated description, a detailed description about the steps is herein omitted.

According to the method for self-interference cancellation in the embodiment of the present invention, up-conversion processing on a baseband transmit signal and down-conversion processing on a radio frequency receive signal are performed based on local oscillator signals generated by a same oscillator source, and self-interference signal cancellation is performed, according to the baseband transmit signal or a baseband reference signal, on a baseband receive signal generated after the down-conversion processing, which can effectively eliminate impact of a phase noise of a radio frequency channel in a system on performance of self-interference cancellation, thereby improving the performance of the self-interference cancellation.

FIG. 6 shows a schematic flowchart of a method 400 for self-interference cancellation according to an embodiment of the present invention. As shown in FIG. 6, the method 400 includes:

S410. Generate a Local Oscillator Signal.

S420. Acquire a radio frequency receive signal, and perform, based on the local oscillator signal, down-conversion processing on the radio frequency receive signal to acquire a baseband receive signal.

S430. Acquire a radio frequency reference signal according to a radio frequency transmit signal, and perform, based on the local oscillator signal, down-conversion processing on the radio frequency reference signal to acquire a baseband reference signal.

S440. Perform self-interference cancellation processing on the baseband receive signal according to the baseband reference signal.

Optionally, the performing self-interference cancellation processing on the baseband receive signal according to the baseband reference signal includes:

acquiring, based on the baseband reference signal, an estimation of a baseband self-interference signal in the baseband receive signal, and canceling the baseband self-interference signal in the baseband receive signal by using the estimation of the baseband self-interference signal.

In specific implementation, the "acquiring, based on the baseband reference signal, an estimation of a baseband self-interference signal in the baseband receive signal" may be estimating a self-interference channel by using a channel estimation technology (for example, a pilot-based frequency-domain channel estimation technology). The baseband reference signal is input into, for example, a time-domain or frequency-domain digital filter, processing is performed on the baseband transmit signal by using the estimated self-interference channel to obtain the estimation of the baseband self-interference signal in the baseband receive signal, and then the self-interference signal in the baseband receive signal can be cancelled by using the estimation of the self-interference signal. In the embodiment of the present invention, according to a relationship between the estimation of the baseband self-interference signal and an actual self-interference signal, the cancellation may be properly changed, for example, adding or subtracting, which is not specifically limited in the present invention.

According to the embodiment of the present invention, the method 400 for self-interference cancellation may be executed by the apparatus 200 shown in FIG. 5, and steps are respectively corresponding to processing by components in the apparatus 200. To avoid a repeated description, a detailed description about the steps is herein omitted.

According to the method for self-interference cancellation in the embodiment of the present invention, down-conversion processing is performed, based on local oscillator signals generated by a same oscillator source, on a radio frequency receive signal and a radio frequency reference signal, and self-interference signal cancellation is performed, according to a baseband reference signal generated after the down-conversion processing, on a baseband receive signal generated after the down-conversion processing, which can effectively eliminate impact of a phase noise of a radio frequency channel in a system on performance of self-interference cancellation, thereby improving the performance of the self-interference cancellation.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

In the several embodiments provided in this application, it should be understood that the disclosed apparatus may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a portable hard disk, a read-only memory (ROM), a random access memory (RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An apparatus for self-interference cancellation, the apparatus comprising:
   a local oscillator, configured to generate and transmit a local oscillator signal;
   a first splitter, configured to receive the local oscillator signal through an input port and split the local oscillator signal into two signals, wherein one of the two signals is transmitted to an up-converter through a first output port of the first splitter and the other signal is transmitted to a delayer through a second output port of the first splitter, wherein the up-converter is connected to the first output port of the first splitter through a first input port and is configured to perform up-conversion processing on a baseband transmit signal received from a second input port using the local oscillator signal received from the first splitter to generate a radio frequency transmit signal, and wherein the delayer is configured to perform delaying processing on the local oscillator signal received from the first splitter through an input port according to a preset target delay;
   a first down-converter, connected to the second output port of the first splitter through a first input port and configured to perform, based on the local oscillator signal received from the first splitter and that is obtained after the delaying processing by the delayer, down-conversion processing on a radio frequency receive signal to acquire a baseband receive signal, wherein a delay value of the delaying processing is a delay between the baseband transmit signal and the baseband receive signal; and
   a self-interference canceller, connected to an output port of the first down-converter through a first input port and configured to perform self-interference cancellation processing on the baseband receive signal received from the first down-converter.

2. The apparatus according to claim 1, wherein the self-interference canceller is connected to a transmit branch through a second input port and is configured to:
   acquire, based on the baseband transmit signal received from the transmit branch, an estimation of a baseband self-interference signal in the baseband receive signal received from the first down-converter; and
   cancel the baseband self-interference signal in the baseband receive signal using the estimation of the baseband self-interference signal.

3. The apparatus according to claim 1, wherein the apparatus further comprises:
   a second splitter, configured to acquire, from the delayer through an input port, the local oscillator signal obtained after the delaying processing, and split the local oscillator signal obtained after the delaying processing into two signals, wherein one of the two signals is transmitted to the first down-converter through a first output port of the second splitter and the other signal is transmitted to a second down-converter through a second output port of the second splitter; and
   a third splitter, configured to acquire the radio frequency transmit signal from the up-converter through an input port and split the radio frequency transmit signal into two signals, wherein one signal is used as a to-be-transmitted signal and is transmitted to a transmit antenna using a first output port of the third splitter; and the other signal is used as a radio frequency reference signal and is transmitted to the second down-converter using a second output port of the third splitter, wherein the second down-converter is configured to perform, based on the local oscillator signal obtained from the second splitter after the delaying processing, down-conversion processing on the radio frequency reference signal received from the third splitter to acquire a baseband reference signal, and send the baseband reference signal to the self-interference canceller, and wherein the self-interference canceller is configured to perform, based on the baseband reference signal received from the second down-converter, self-interference cancellation processing on the baseband receive signal received from the first down-converter.

4. The apparatus according to claim 3, wherein the self-interference canceller is configured to:

acquire, based on the baseband reference signal received from the second down-converter, an estimation of a baseband self-interference signal in the baseband receive signal received from the first down-converter; and cancel the baseband self-interference signal in the baseband receive signal using the estimation of the baseband self-interference signal.

5. The apparatus according to claim 1, wherein:
the target delay is determined according to a first delay, a second delay, and a third delay;
the first delay is a processing delay after the up-conversion processing in a transmit branch;
the second delay is a processing delay before the down-conversion processing in a receive branch; and
the third delay is an average delay of a multipath signal from a transmit antenna to a receive antenna.

6. The apparatus according to claim 2, wherein:
the target delay is determined according to a first delay, a second delay, and a third delay;
the first delay is a processing delay after the up-conversion processing in a transmit branch;
the second delay is a processing delay before the down-conversion processing in a receive branch; and
the third delay is an average delay of a multipath signal from a transmit antenna to a receive antenna.

7. The apparatus according to claim 3, wherein:
the target delay is determined according to a first delay, a second delay, and a third delay;
the first delay is a processing delay after the up-conversion processing in a transmit branch;
the second delay is a processing delay before the down-conversion processing in a receive branch; and
the third delay is an average delay of a multipath signal from a transmit antenna to a receive antenna.

8. The apparatus according to claim 4, wherein:
the target delay is determined according to a first delay, a second delay, and a third delay;
the first delay is a processing delay after the up-conversion processing in a transmit branch;
the second delay is a processing delay before the down-conversion processing in a receive branch; and
the third delay is an average delay of a multipath signal from a transmit antenna to a receive antenna.

9. An apparatus for self-interference cancellation, the apparatus comprising:
a local oscillator, configured to generate and transmit a local oscillator signal;

a first splitter, configured to receive the local oscillator signal through an input port and split the local oscillator signal into two signals, wherein one of the two signals is transmitted to a first down-converter through a first output port of the first splitter and the other signal is transmitted to a second down-converter through a second output port of the first splitter, wherein the first down-converter is connected to the first output port of the first splitter through a first input port and is configured to perform, based on the local oscillator signal received from the first splitter, down-conversion processing on a radio frequency receive signal received from a second input port to acquire a baseband receive signal, and send the baseband receive signal to a self-interference canceller; and a second splitter, connected to a second input port of the second down-converter through a second output port and configured to acquire a radio frequency reference signal according to a radio frequency transmit signal received from an input port, and send the radio frequency reference signal to the second down-converter, wherein the second down-converter is connected to the second output port of the first splitter through a first input port, configured to perform, based on the local oscillator signal received from the first splitter, down-conversion processing on the radio frequency reference signal received from the second splitter through a second input port to acquire a baseband reference signal, and send the baseband reference signal to the self-interference canceller, and wherein the self-interference canceller is connected to an output port of the first down-converter through a first input port and is configured to perform self-interference cancellation processing on the baseband receive signal received from the first down-converter according to the baseband reference signal received from the second down-converter.

10. The apparatus according to claim 9, wherein the self-interference canceller is configured to:

acquire, based on the baseband reference signal received from the second down-converter, an estimation of a baseband self-interference signal in the baseband receive signal received from the first down-converter; and cancel the baseband self-interference signal in the baseband receive signal using the estimation of the baseband self-interference signal.

11. A method for self-interference cancellation, the method comprising:

generating a local oscillator signal;

acquiring a baseband transmit signal, and performing up-conversion processing on the baseband transmit signal according to the local oscillator signal to generate a radio frequency transmit signal;

performing delaying processing on the local oscillator signal according to a preset target delay;

acquiring a radio frequency receive signal, and performing, based on the local oscillator signal obtained after the delaying processing, down-conversion processing on the radio frequency receive signal to acquire a baseband receive signal, wherein the target delay is a delay between the baseband transmit signal and the baseband receive signal; and performing self-interference cancellation processing on the baseband receive signal.

12. The method according to claim 11, wherein performing self-interference cancellation processing on the baseband receive signal comprises:
acquiring, based on the baseband transmit signal, an estimation of a baseband self-interference signal in the baseband receive signal, and canceling the baseband self-interference signal in the baseband receive signal by using the estimation of the baseband self-interference signal.

13. The method according to claim 11, wherein:
the method further comprises:
acquiring a radio frequency reference signal according to the radio frequency transmit signal, and
performing, based on the local oscillator signal obtained after the delaying processing, down-conversion processing on the radio frequency reference signal to acquire a baseband reference signal; and
performing self-interference cancellation processing on the baseband receive signal comprises:
performing, based on the baseband reference signal, self-interference cancellation processing on the baseband receive signal.

14. The method according to claim 13, wherein performing, based on the baseband reference signal, self-interference cancellation processing on the baseband receive signal comprises:
acquiring, based on the baseband reference signal, an estimation of a baseband self-interference signal in the baseband receive signal, and canceling the baseband self-interference signal in the baseband receive signal by using the estimation of the baseband self-interference signal.

15. The method according to claim 11, wherein:
the target delay is determined according to a first delay, a second delay, and a third delay;
the first delay is a processing delay after the up-conversion processing in a transmit branch;
the second delay is a processing delay before the down-conversion processing in a receive branch; and
the third delay is an average delay of a multipath signal from a transmit antenna to a receive antenna.

16. The method according to claim 12, wherein:
the target delay is determined according to a first delay, a second delay, and a third delay;
the first delay is a processing delay after the up-conversion processing in a transmit branch;
the second delay is a processing delay before the down-conversion processing in a receive branch; and
the third delay is an average delay of a multipath signal from a transmit antenna to a receive antenna.

17. The method according to claim 13, wherein:
the target delay is determined according to a first delay, a second delay, and a third delay;
the first delay is a processing delay after the up-conversion processing in a transmit branch;
the second delay is a processing delay before the down-conversion processing in a receive branch; and
the third delay is an average delay of a multipath signal from a transmit antenna to a receive antenna.

18. The method according to claim 14, wherein:
the target delay is determined according to a first delay, a second delay, and a third delay;
the first delay is a processing delay after the up-conversion processing in a transmit branch;
the second delay is a processing delay before the down-conversion processing in a receive branch; and
the third delay is an average delay of a multipath signal from a transmit antenna to a receive antenna.

* * * * *